United States Patent [19]

Rochelt

[11] 4,367,658
[45] Jan. 11, 1983

[54] OSCILLATING MEMBER FOR TRANSFORMING A ROTARY MOTION INTO A RECIPROCATING MOTION

[76] Inventor: Günter Rochelt, Josef-Schwarz-Weg 11, DE 8000 München - Solln, Fed. Rep. of Germany

[21] Appl. No.: 175,204

[22] Filed: Jul. 31, 1980

[30] Foreign Application Priority Data

Aug. 2, 1979 [DE] Fed. Rep. of Germany ....... 2931479

[51] Int. Cl.³ ...................... F16H 21/32; F16H 21/18
[52] U.S. Cl. .......................................... 74/40; 74/42; 74/43; 74/110; 74/581
[58] Field of Search ................. 74/38, 40, 42, 43, 106, 74/110, 519, 520, 581

[56] References Cited

U.S. PATENT DOCUMENTS

| | | | |
|---|---|---|---|
| 1,359,020 | 11/1920 | Beshara . | |
| 2,177,398 | 10/1939 | Aller | 74/519 |
| 2,949,037 | 8/1960 | Knappe | 74/520 |
| 3,202,082 | 8/1965 | Viehmann | 74/519 |
| 3,240,077 | 3/1966 | Smith | 74/40 |
| 3,261,215 | 7/1966 | Simpson | 74/42 |
| 3,515,034 | 6/1970 | Eklund | 74/581 |
| 3,561,115 | 2/1971 | Palm . | |

FOREIGN PATENT DOCUMENTS

| | | |
|---|---|---|
| 2631751 | 2/1977 | Fed. Rep. of Germany . |
| 2603207 | 8/1977 | Fed. Rep. of Germany ........ 74/519 |
| 411879 | 6/1910 | France . |
| 844582 | 7/1939 | France . |
| 7340365 | 6/1974 | France . |
| 624331 | 6/1949 | United Kingdom .................. 74/519 |

OTHER PUBLICATIONS

Strasser, "10 Ways to Change Straight-Line Motion", Product Engineering, Feb. 29, 1960, pp. 61 and 63.

Primary Examiner—Lawrence J. Staab
Attorney, Agent, or Firm—Michael J. Striker

[57] ABSTRACT

A bell-crank lever having substantially stiff lever arms, which are approximately at right angles to each other, is connected to a stationary part by a film hinge that is secured adjacent to the junction of the lever arms and defines a bending axis which is at right angles to the plane of the bell-crank lever. An oscillating arm is secured to the free end of one of said lever arms and extends approximately parallel to the other of said lever arms and about film hinges which define bending axes that are at right angles to each other is bendable in the plane of the bell-crank lever and at right angles to that plane. An oscillating beam bar is connected to the other of said lever arms by a film hinge defining a bending axis at right angles to the plane of the bell-crank lever. The oscillating arm has in its free end portion a bearing bore for connection to a driving crank pin. The oscillating beam bar is substantially aligned with the axis of rotation of said crank pin.

13 Claims, 10 Drawing Figures

OSCILLATING MEMBER FOR TRANSFORMING A ROTARY MOTION INTO A RECIPROCATING MOTION

BACKGROUND OF THE INVENTION

This invention relates to an oscillating member for transforming a rotary motion into a reciprocating motion, which member is connected by a film hinge to a stationary member and comprises a resiliently flexible oscillating arm, which has in its free end portion a bearing bore for a crankpin of a shaft of a drive motor.

An oscillating member of this kind is known from Opened German Specification No. 2,117,319 and constitutes part of an oscillating frame, which serves to drive the movable shear blade of hair clippers and can be described in simplified form as a four-bar linkage having parallel sides and parallel ends and having film hinges rather than pivot joints. Film hinges are resiliently flexible strips or elastic bars having portions which are smaller in cross-section and can be resiliently bent from a position of rest about an axis which is parallel to their transverse axis. Owing to the kinematics of a four-bar linkage, the known oscillating frame has the disadvantage that the oscillating bar which carries the shear blade cannot only oscillate in the plane of the four-bar linkage but in accordance with the arcs of circles described by the end points of the film hinges describes in that plane a translational motion which is superposed on the reciprocating motion. This translational up and down motion at right angles to the reciprocating motion of the oscillating bar, which is pivotally movable parallel to itself, can be tolerated in hair clippers, where such translational motion will result merely in a slight gyratory motion of the movable shear blade on the fixed shear blade. But there are numerous machines and apparatus which must be operated to perform a straight-line reciprocating motion that is derived from a rotary motion produced by a drive motor.

An oscillating frame for deriving a straightline reciprocating motion from a rotary motion produced by a drive motor has been described in the prior German Patent Application No. P 29 1o 469. In that known oscillating frame, the oscillating bar that is connected to the element to be driven performs a reciprocating translational motion at right angles to the drive shaft of the drive motor. On the other hand, numerous advantageous devices could be made if they could be driven by a reciprocating translational motion which is derived from the rotation of the drive motor and aligned with the axis of rotation of the motor.

SUMMARY OF THE INVENTION

It is an object of the invention to provide an oscillating member which is of the kind described first hereinbefore and is simple in structure and can be economically manufactured and is capable of transforming a rotary motion into a straight-line reciprocating translational motion which is aligned with the axis of rotation of the rotary motion.

In an oscillating member of the kind stated first hereinbefore, this object is accomplished in that the member consists substantially of a bell-crank lever having substantially stiff lever arms, which are approximately at right angles to each other, that the film hinge which connects the member to the stationary part is secured adjacent to the junction of the lever arms and defines a bending axis which is at right angles to the plane extending through the lever arms (plane of bellcrank lever), that the oscillating arm is secured to the free end of one of the lever arms and extends approximately parallel to the other of the lever arms and about film hinges which define bending axes that are at right angles to each other is bendable in the plane of the bell-crank lever and at right angles to that plane, and that an oscillating bar which is substantially aligned with the shaft of the drive motor is secured to the other of said lever arms by a film hinge defining a bending axis at right angles to the plane of the bell-crank lever. In the device according to the invention, the translational motion of the crank pin as projected on the center plane of the bell-crank lever is transformed by the bell-crank lever, in dependence on the eccentricity of the crank pin, into a reciprocating motion, which is aligned with the axis of rotation of the drive motor because the oscillating bar is longitudinally aligned with the shaft of the drive motor.

The drive means according to the invention can be made in a simple manner and at low cost from plastics and consists preferably of a single injection-molded member of plastic material.

The drive means according to the invention give rise only to small losses because friction exists substantially only between the crank pin of the shaft and the bearing bore of the oscillating arm and because the energy required to elastically deform the film hinges is recovered as the film hinges are deflected in the opposite sense so that there are only low hysteresis losses. The drive means according to the invention will involve a particularly low loss if the drive means are so designed that their natural frequency of oscillation agrees with the frequency of the drive motion generated by it.

The drive means according to the invention can be used within a very wide field, which will be illustrated only by a few examples: Nail-filing devices driven by midget motors, cosmetic shavers having oppositely moving cutting blades, rod-shaped shavers having a cutting cylinder which is moved up and down in a sieve cylinder, toothbrushes, massage appliances of all kinds, electrically operated knives, hedge-shears, parallel lawn mowers, piercing saws and files, drive means for pumps, small compressors, spray guns, impact drive means for drilling equipments having a drilling spindle extending axially through the oscillating bar which performs a translational oscillation.

According to a further development of the invention, two bell-crank levers have respective lever arms which extend toward each other and in position of rest lie approximately in a common plane and are connected by a film hinge, the oscillating beam is connected to the centre of said film hinge by another film hinge, and the oscillating arms are secured to the free ends of the other lever arms of the bell-crank levers and have bearing bores mounted on the shaft, which has two cranks. In this embodiment the two bell-crank levers stabilize each other so that the oscillating bar performs a straight-line reciprocating motion which is aligned with the axis of rotation of the drive motor without need for additional parallel motion means.

The film hinges which hold the bell-crank levers are suitably secured to elastic supports, which are connected to the housing and compensate the translational motion of the bell-crank levers that is transverse to the axis of rotation.

The film hinges holding the bell crank levers may alternatively secured to blocks, which are pivoted on pins that are fixed to the housing and which are interconnected by an elastic bar defining a bending axis that is parallel to the pins.

Unless a parallel-motion of the oscillating bar is ensured by the element driven by said bar, separate parallel motion means may be provided.

According to a further feature of the invention, such separate parallel-motion means are provided in that the oscillating bar is connected to the centre of the elastic central bar of a parallel-oscillating frame and extends at right angles to said bar, said parallel oscillating frame consists of mutually parallel oscillating end bars, to which the ends of the central bar are secured, two additional elastic bars are secured to said end bars on opposite sides of said central bar and are spaced from the latter, and the inner ends of the additional elastic bars are secured to webs, which are fixed to the housing and which have center lines that are aligned with each other and are parallel to the oscillating end bars and extend through the center of the oscillating bar at right angles to the latter. When the oscillating bar which is aligned with the drive shaft is oscillating, the lateral oscillating bars will oscillate in a transverse plane to stabilize the central oscillating bar in its central position.

According to a further feature of the invention the lever arms of the bell-crank lever may include an angle differing from 90° and/or may differ in length. These measures may be adopted to provide certain transmission ratios. If that lever arm which is driven by the crank pin by means of the oscillating arm is shorter than that lever arm which carries the oscillating bar, e.g., the translational motion of the oscillating bar will exceed twice the eccentricity of the crank pin. Whereas such an arrangement would cause the center line of the drive shaft to be offset from the line on which the oscillating bar is moving, such offset can be tolerated in numerous applications if these lines are parallel.

If the lever arms of the bell-crank lever include an angle differing from 90°, the oscillating member may deviate to a larger extent from a straight-line translational motion. If such deviation cannot be tolerated, it may be suppressed by parallel-motion means.

Additional desirable features of the invention will be described in the sub-claims. The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
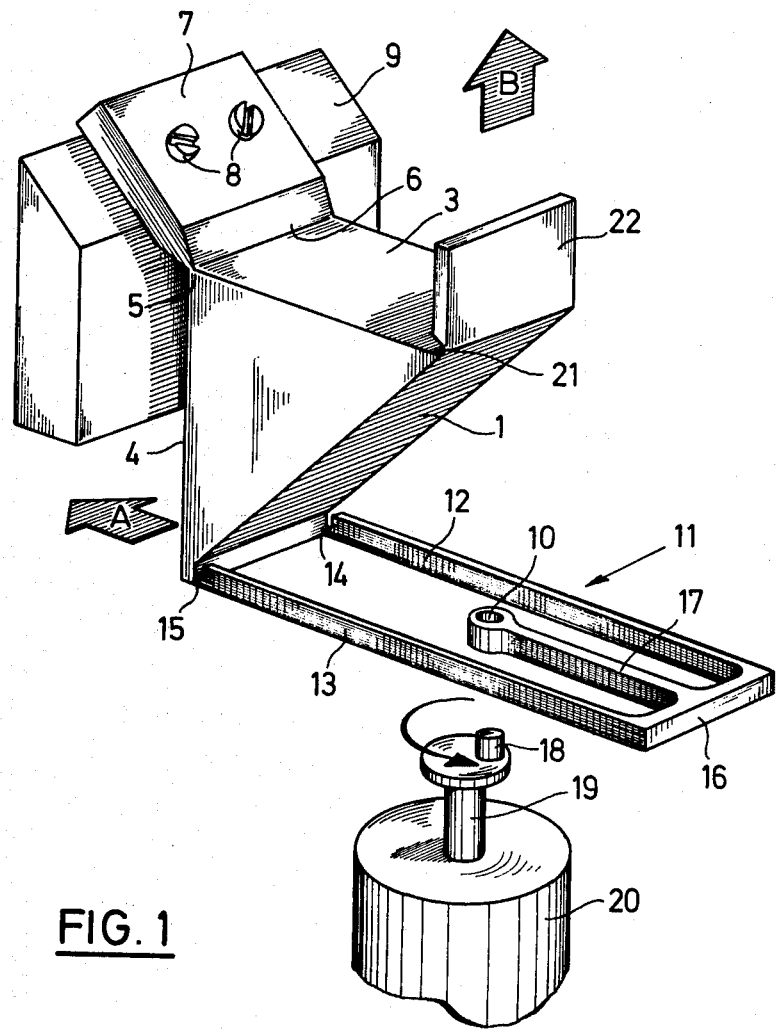
FIG. 1 is a perspective view showing drive means used to transform a rotary motion into a reciprocating motion and comprising an oscillating member which consists of a bell-crank lever.
Figure 1A:
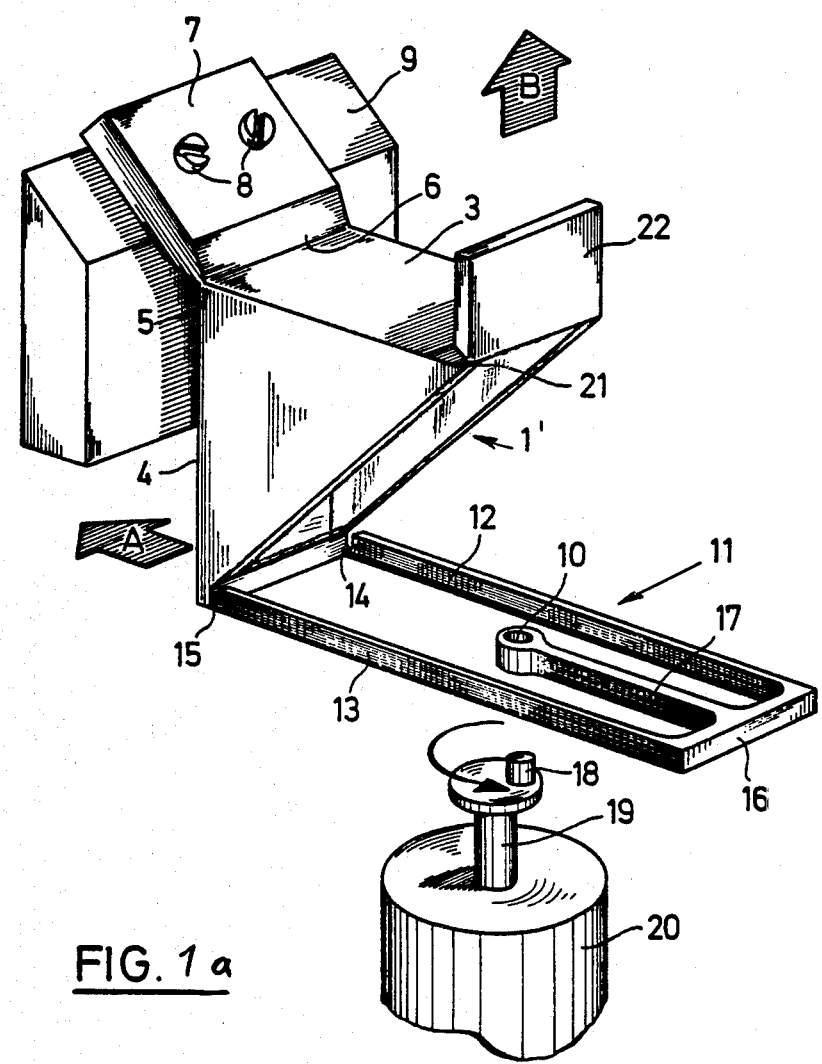
FIG. 1a is a view substantially corresponding to that of FIG. 1 but showing a modification of the bell-crank lever.

In the drive means shown in FIG. 1, an oscillating member 1 consists of a bell-crank lever and has in vertical section the configuration of an isosceles right-angled triangle having legs 3, 4 which are constituted by the lever arms. Adjacent to a corner 5, the oscillating member 1 is connected by a film hinge 6 to a holder 7, which is secured by screws 8 to a housing 9, which is shown only in part. An oscillating arm 11 has a bearing bore 10 and is secured to the free end of the lever arm 4 of the oscillating member 1. The oscillating arm 11 consists of a rectangular oscillating frame having long side bars 12, 13, which constitute film hinges defining vertical bending axes. The bars 12, 13 are connected to the lever arm 4 by thinner portions 14, 15, which constitute film hinges defining horizontal bending axes. The bars 12, 13 are connected at one end by a bar 16, to the center of which an arm 17 is secured. The arm 17 is provided in its free end portion with the bearing bore 10 for a crank pin 18. The arm 17 consists also of a bar which constitutes a film hinge that defines a vertical bending axis.

The crank pin 18 is eccentrically secured to a shaft 19 of an electric motor 20.

An oscillating beam or bar 22 is secured by the film hinge 21 to the free end of the lever arm 3 of the oscillating member 1 and by means which are not shown is connected to the element which should be driven to perform a translational reciprocating motion.

The directions of movement of the free ends of arms 3, 4 are indicated by arrows A and B.

Figure 2:
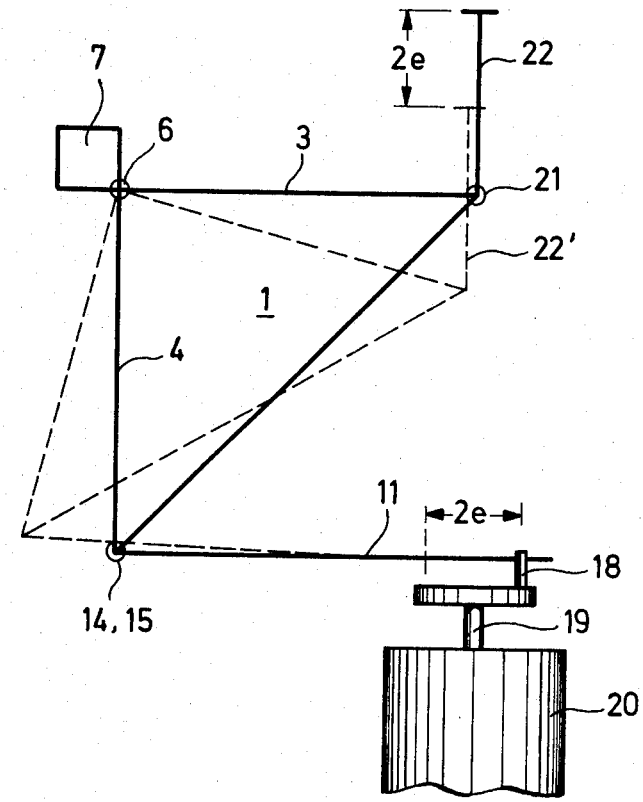
FIG. 2 is a diagrammatic representation of the motions of the drive means of FIG. 1, FIGS. 2a, 2b and 2c are views substantially corresponding to that of FIG. 2 but showing further modifications of the bell-crank lever.

The kinematics of the drive means shown in FIG. 1 will now be briefly explained with reference to FIG. 2. The end positions of the oscillating member 1, which is pivotally moved by the crank pin 18 of the drive shaft 19 through the intermediary of the oscillating arm 11, are indicated by solid and dotted lines, respectively. In both end positions the oscillating bar 22 is approximately aligned with the axis of the drive shaft 19. In the left-hand end position the oscillating bar 22' indicated by dotted lines is slightly offset to the left from the right-hand end position in which the oscillating bar 22 is shown in solid lines. This slight offset is compensated in that the oscillating bar 22 is deflected about the film hinge 21.

As the arms 3, 4 of the oscillating member 1 have the same length, the stroke of the oscillating bar 22 is approximately twice the eccentricity 2e of the crank pin 18.

Figure 3:
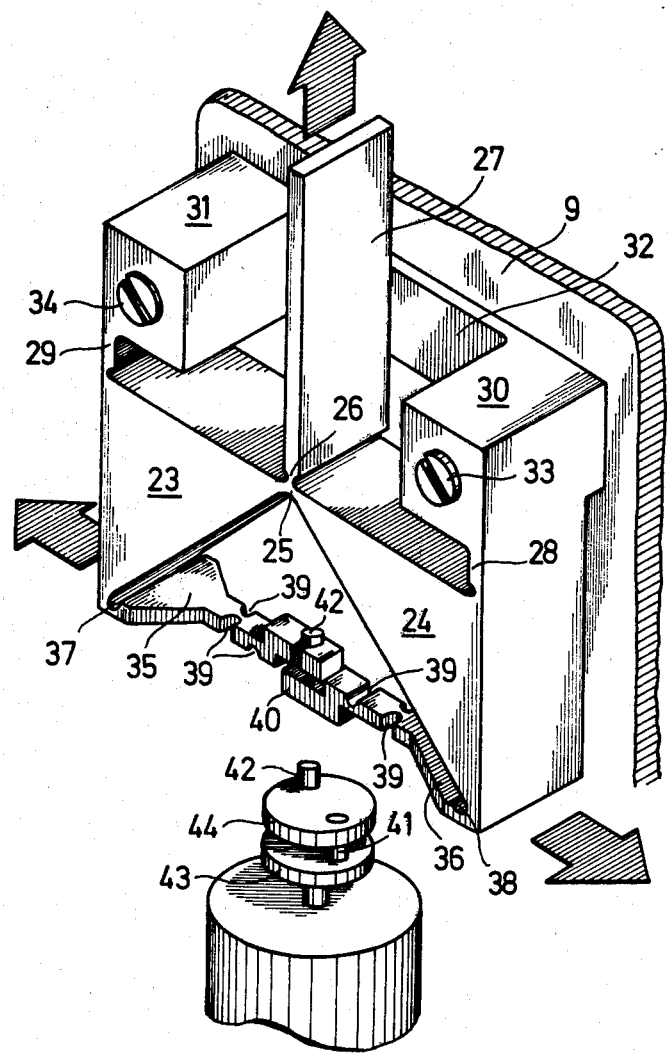
FIG. 3 is a perspective view showing drive means used to transform a rotary motion into a reciprocating motion and comprising two oscillating members which consist of bell-crank levers interconnected by a film hinge.

In the drive means shown in FIG. 3, two oscillating members 23, 24 consisting of bell-crank levers are interconnected by a film hinge 25 at the free ends of those of their lever arms which extend toward each other. An oscillating bar 27 rises from the film hinge 25 and is secured to the centre thereof by an additional film hinge 26. In the embodiment shown by way of example, the film hinges 25, 26 are combined in a starlike configuration. The corners joining the arms of the oscillating members 23, 24 are connected by barshaped film hinges 28, 29 to blocks 30, 31 which are interconnected by a web 32. The blocks 30, 31 are secured by screws 33, 34 to a housing wall 9.

Oscillating arms 35, 36 are secured by film hinges 37, 38 to the free ends of the depending arms of the oscillating members 23, 24. Grooves 39 at right angles to each other are formed in the oscillating arms to weaken them in cross-section so that film hinges are obtained which permit the oscillating arms 35, 36 to oscillate in the plane of the bell-crank levers and transversely to that plane.

The bearing bores in the free end portions of the oscillating arms 35, 36 are provided with slots 40 so that the bearing bores can be laterally forcefitted on the crank pins 41, 42, which are disposed on mutually parallel diameters of discs 43, 44. The disc 44 provided with the crank pin 42 is carried by the crank pin 41 provided on the disc 43.

The barlike film hinges 28, 29 are so long that the oscillating members 23, 24 can easily perform also the required translational motion in a horizontal plane.

Figure 4:
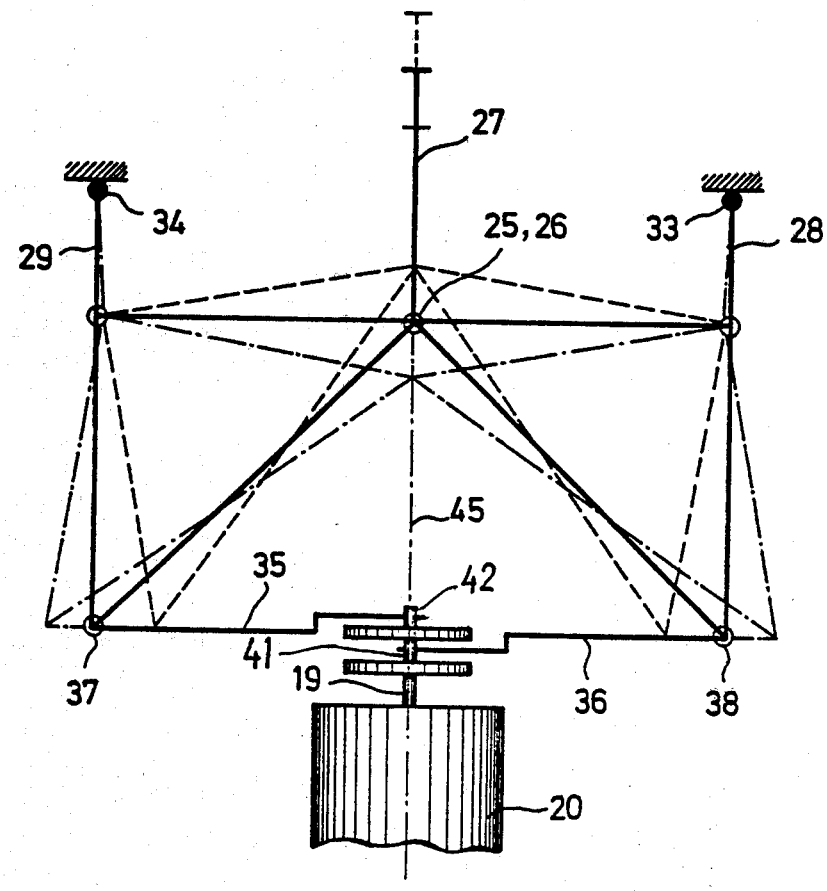
FIG. 4 is a diagrammatic representation of the motions of the drive means of FIG. 3.

The kinematics of the drive means shown in FIG. 3 are diagrammatically shown in FIG. 4. The central position of rest is indicated by dotted lines. The outer and inner end positions are respectively indicated by dotted lines and dash-dot lines. The film hinges formed by bar portions smaller in cross-section are indicated by circles.

It is readily apparent from FIG. 4 that the rotary motion of the motor shaft 19 is transformed into a reciprocating translatory motion of the oscillating bar 27 in alignment with the axis 45 of the shaft 19.

Figure 5:
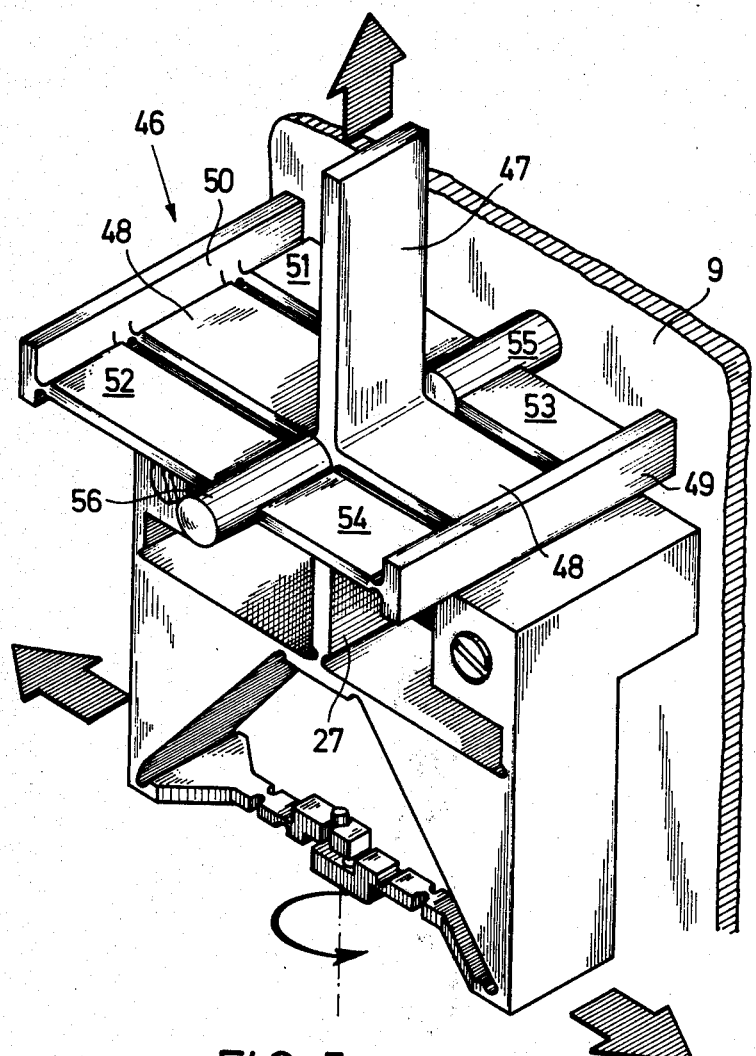
FIG. 5 is a perspective view showing drive means which are similar to those of FIG. 3 and comprise a parallel-oscillating frame for stabilizing the central oscillating bar.

In FIG. 5 the lower part of the drive means serves to transform the rotary motion into a reciprocating motion and is similar to the drive means described with reference to FIGS. 3 and 4 and for this reason the description is not repeated. In the embodiment of FIG. 5, the oscillating bar 27 is additionally stabilized by a parallel-oscillating frame 46, which will be briefly explained hereinafter. An upper portion 47 of the oscillating bar 27 extends centrally through a central bar 48, which is at right angles to the bar 27. The bar 48 forms film hinges and at its free ends is connected to the centres of freely oscillating end bars 49, 50. Bars 51 to 54 which also form film hinges are provided on opposite sides of the bar 48 and are connected at their outer ends to the oscillating end bars 49, 50 and ar their inner ends to the webs 55, 56, which are connected to the housing. The web 55 is secured to the housing wall 9 and the web 56 is secured by means not shown to the opposite housing wall. The bars 51 to 54 and the oscillating end bars 49, 50 constitute a rectangular frame. The bars 48 and 51 to 54 are parallel to each other. The bar 48 is about twice as large in cross-section as the bars on opposite sides of the bar 48 so that the central bar 48 has about the same stiffness as the two outer bars.

Figure 6:
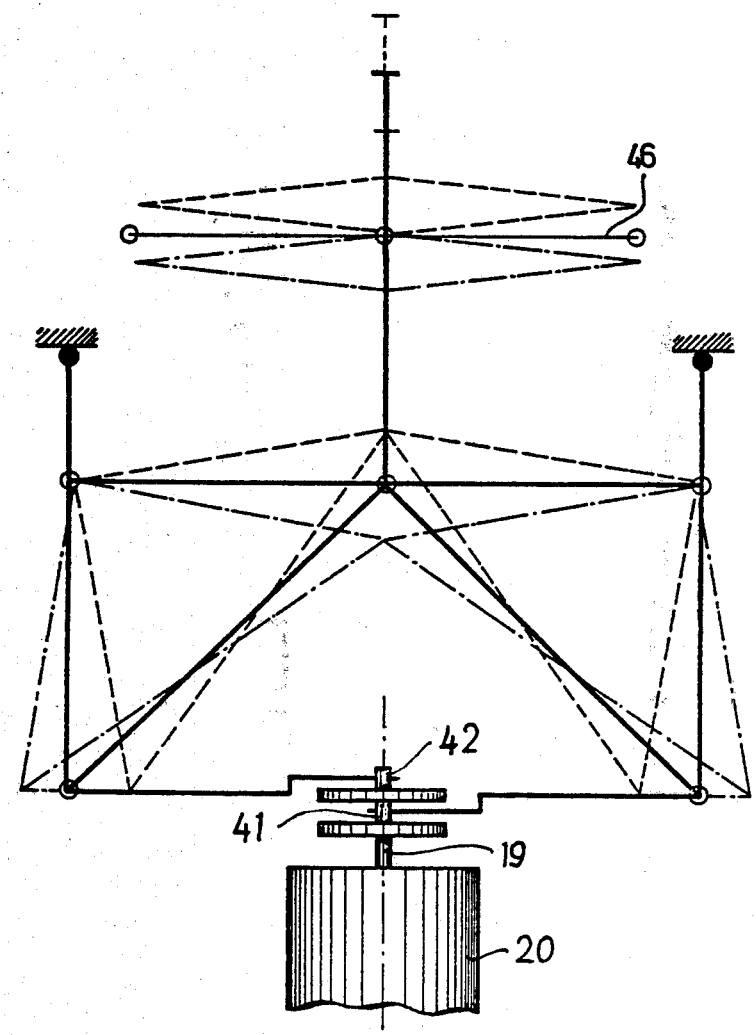
FIG. 6 is a diagrammatic representation of the motions of the drive means shown in FIG. 5.

FIG. 6 shows the oscillating frame 46 in solid lines in its intermediate position of rest, in dotted lines in its upper deflected position, and in dash-dot lines in its lower deflected position. In addition to their vertical up and down motion, the oscillating end bars perform a small reciprocating motion in a horizontal direction so that the oscillating bar 28, 47 is constrained to move along a straight line, which is aligned with the axis of the drive shaft.

As can be seen from FIG. 1, a bell-crank lever may include a plurality of bars forming an angle, and triangular side walls closing the same.

Figure 2A:
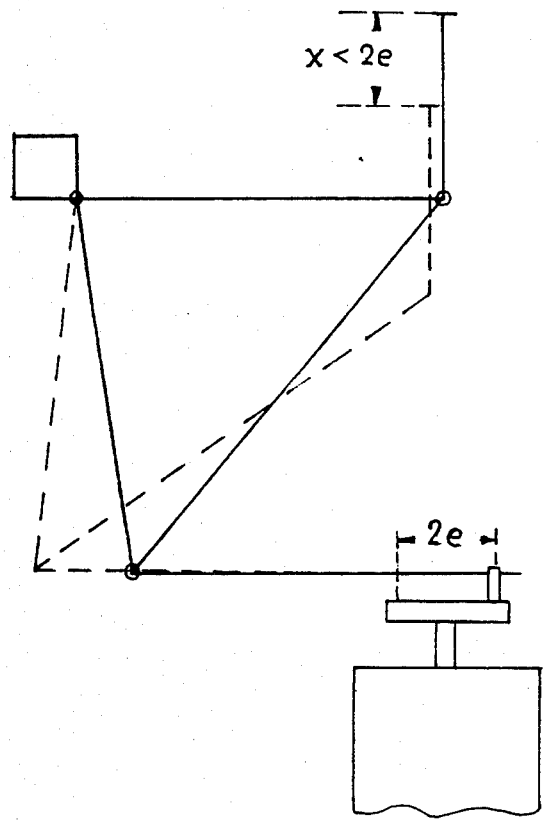
Figure 2B:
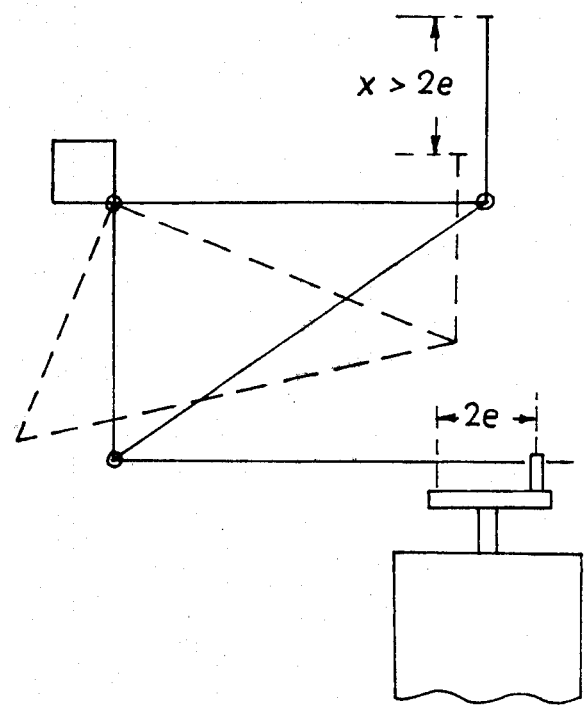
Figure 2C:
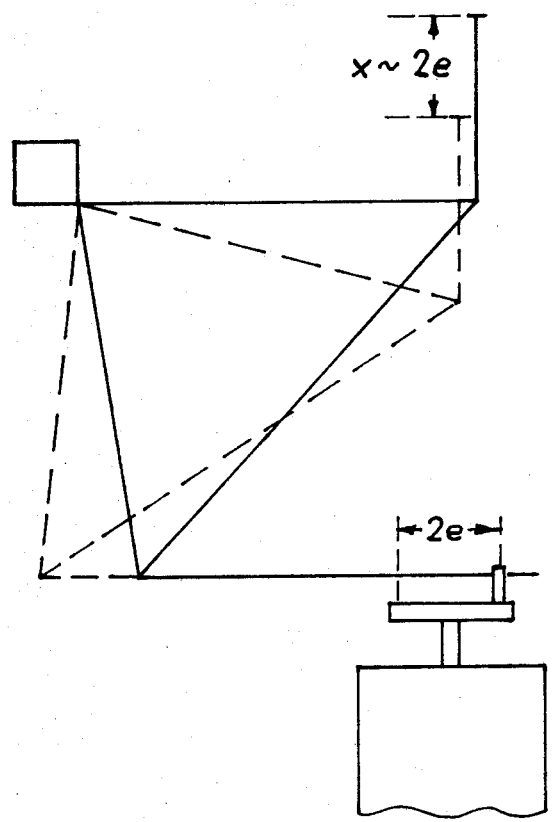

FIG. 2a shows that lever arms of a bell-crank lever may include an angle smaller than 90°. FIG. 2b shows a bell-crank lever having lever arms of different lengths extending at an angle of 90° to one another. Finally, a bell-crank lever of FIG. 2c has lever arms of different lengths extending relative to one another at an angle smaller than 90°.

It will be understood that each of the elements described above, or two or more together, may also find a useful application in other types of constructions differing from the types described above.

While the invention has been illustrated and described as embodied in an oscillating member for transforming a rotary motion into a reciprocating motion it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly consititute essential characteristics of the generic or specific aspects of this invention.

What is claimed as new and desired to be protected by Letters Patent is set forth in the appended claims:

1. An oscillating member for transforming a rotary motion of a drive motor into a reciprocating motion, comprising a bell-crank lever having substantially stiff lever arms which extend at an angle to each other to their junction with one another and define a bell crank lever plane, said bell crank lever being connected to a stationary part by a first film hinge secured to said bell-crank lever adjacent to said junction of said lever arms and defining a bending axis, a second such bell-crank lever connected to the stationary part by such a first hinge and having such lever arms which also in position of rest lie substantially in said plane, one of said lever arms of said first mentioned and second bell-crank levers being connected by a connecting film hinge; an oscillating arm secured to a free end of one of said lever arms and extending substantially parallel to the other of said lever arms, said oscillating arm being provided with a plurality of further film hinges which define bending axes and render said oscillating arm bendable in said plane, a second oscillating arm secured to a free end of the other lever arm of saidsecond bell-crank lever, said oscillating arms having bearing bores mounted on a motor shaft which has two crank pins; and an oscillating beam substantially aligned with a drive shaft of a drive motor and secured to said other lever arm of said first-mentioned and second bell-crank levers by an additional film hinge defining a bending axis which extends at right angle to said plane, said oscillating beam being connected to the center of said connecting film hinge by said additional film hinge.

2. An oscillating member as defined in claim 1, wherein said bell crank levers are formed as isosceles right-angled triangle.

3. An oscillating member as defined in claim 1, wherein said bell crank levers include a plurality of bars forming an angle, and triangular side walls closing the latter.

4. An oscillating member as defined in claim 1, wherein the stationary part is formed as a housing; and further comprising elastic supports which are parallel to each other and secured to the housing, said first hinges holding said bell crank levers being secured to said elastic supports.

5. An oscillating member as defined in claim 1, wherein said stationary part is a housing; and further comprising two blocks to which said first film hinges holding said bell crank levers are secured, two pins pivotally fixing said blocks to the housing, and an elastic bar interconnecting said blocks and defining a bending axis parallel to said pins.

6. An oscillating member as defined in claim 1, wherein said oscillating beam is provided with parallel motion means.

7. An oscillating member as defined in claim 1; and further comprising a parallel-oscillating frame having an elastic central bar, mutually parallel oscillating end bars to which the ends of said central bar are secured, two additional elastic bars secured to said end bars on opposite sides of said central bar and spaced from the latter, webs to which the inner ends of said additional elastic bars are secured, said webs being fixed to the housing and having central lines aligned with each other and parallel to said oscillating end bars, said oscillating beam being connected to the center of said elastic central bar of said frame, and said webs having axes extending through the center of said oscillating beam at right angles to the latter.

8. An oscillating member as defined in claim 1, wherein said bell crank levers, oscillating beam, and film hinges with their parts securing them to the stationary part are integrally composed of elastic synthetic plastic material.

9. An oscillating member as defined in claim 1, wherein said oscillating arms have bearing bores provided with slots for laterally fitting arms of the crank pins.

10. An oscillating member as defined in claim 1, wherein said lever arms of said bell crank levers include an angle differing from 90°.

11. An oscillating member as defined in claim 1, wherein said lever arms of said bell crank levers have differing lengths.

12. An oscillating member as defined in claim 10, wherein said lever arms of said bell crank levers have differing lengths.

13. An oscillating member as defined in claim 1, wherein said lever arms of said bell crank levers include an angle equal to 90°.

* * * * *